(12) United States Patent
Nishino et al.

(10) Patent No.: US 8,872,118 B2
(45) Date of Patent: Oct. 28, 2014

(54) RADIOGRAPHIC IMAGE DETECTING APPARATUS AND RADIOGRAPHIC IMAGE CAPTURING SYSTEM

(75) Inventors: Naoyuki Nishino, Ashigarakami-gun (JP); Naoto Iwakiri, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 437 days.

(21) Appl. No.: 13/302,699

(22) Filed: Nov. 22, 2011

(65) Prior Publication Data

US 2012/0132824 A1 May 31, 2012

(30) Foreign Application Priority Data

Nov. 26, 2010 (JP) .................. 2010-264102
Nov. 9, 2011 (JP) .................. 2011-245085

(51) Int. Cl.
*H01L 27/146* (2006.01)
*H04N 5/32* (2006.01)

(52) U.S. Cl.
CPC .................... *H04N 5/32* (2013.01)
USPC .................................................. 250/370.09

(58) Field of Classification Search
USPC .................................................. 250/370.09
See application file for complete search history.

(56) References Cited

U.S. PATENT DOCUMENTS

| | | | | |
|---|---|---|---|---|
| 4,789,777 A | * | 12/1988 | Takami et al. | 250/214 A |
| 2006/0072025 A1 | * | 4/2006 | Kakumoto et al. | 348/308 |
| 2008/0237479 A1 | * | 10/2008 | Iwakiri | 250/370.08 |
| 2010/0014875 A1 | * | 1/2010 | Uto | 398/202 |
| 2010/0051795 A1 | * | 3/2010 | Tsubota et al. | 250/252.1 |

FOREIGN PATENT DOCUMENTS

JP 2009-219538 A 10/2009

* cited by examiner

*Primary Examiner* — David Porta
*Assistant Examiner* — Mindy Vu
(74) *Attorney, Agent, or Firm* — Sughrue Mion, PLLC

(57) ABSTRACT

A radiographic image detecting apparatus and a radiographic image capturing system are provided. The radiographic image detecting apparatus includes photoelectric conversion elements for generating electric charge by emission of radiation, a bias line through which a bias voltage is supplied to the photoelectric conversion elements, a power supply for applying the bias voltage to the photoelectric conversion elements through the bias line, a current detector for detecting a bias current flowing through the bias line based on a voltage drop across a resistor inserted in the bias line, a first amplifying circuit, a second amplifying circuit connected to an output of the first amplifying circuit, and a controller for correcting the electric signal by increasing a gain of the second amplifying circuit depending on decrease in a sensitivity of the photoelectric conversion element, the decrease being caused by the voltage drop.

20 Claims, 13 Drawing Sheets

RADIOGRAPHIC IMAGE DETECTING APPARATUS AND RADIOGRAPHIC IMAGE CAPTURING SYSTEM

CROSS-REFERENCE TO RELATED APPLICATION

This application is based upon and claims the benefit of priority from Japanese Patent Applications No. 2010-264102 filed on Nov. 26, 2010, and No. 2011-245085 filed on Nov. 9, 2011, of which the contents are incorporated herein by reference.

BACKGROUND OF THE INVENTION

1. Field of the Invention

The present invention relates to a radiographic image detecting apparatus for detecting radiation that has passed through a human body, and a radiographic image capturing system which incorporates such a radiographic image detecting apparatus therein.

2. Description of the Related Art

In the medical field, there have been employed portable radiographic image detecting apparatus such as an FPD (Flat Panel Detector) or the like for detecting the intensity of radiation that has passed through a human body thereby to capture images of regions in the human body. The FPD, which is also referred to as "electronic cassette", is capable of capturing an image of a region in a patient while the patient is lying on the bed or the like. The FPD is also capable of adjusting a region to be imaged by changing its own position. Consequently, the FPD can be flexibly used for image patients who are unable to move their own bodies.

Under such circumstances, various radiographic image detecting apparatus have been proposed in the art. One such radiographic image detecting apparatus is of the direct conversion in which photoelectric conversion elements generates electric charges in response to radiation applied thereto and then converts the generated electric charges into electric signals. Another radiographic image detecting apparatus is of the indirect conversion in which a scintillator or the like converts radiation applied thereto into an electromagnetic wave such as visible light or the like having a wavelength other than the wavelength of the radiation, and photoelectric conversion elements such as photodiodes or the like generate electric charges in response to the electromagnetic wave applied thereto and converts the generated electric charges into electric signals.

In such radiographic image detecting apparatus, the photoelectric conversion elements are disposed in respective areas delimited by a plurality of scanning lines and a plurality of signal lines that are disposed on a substrate such as a glass substrate, a flexible substrate, or the like so as to intersect one another. Radiation or electromagnetic wave converted from radiation is applied to the photoelectric conversion elements, whereby the photoelectric conversion elements generate and store electric charges. The stored electric charges are read from the photoelectric conversion elements, i.e., pixels, through the signal lines as electric signals.

The radiographic image detecting apparatus in the form of FPDs are, however, problematic in that the amount of electric charges accumulated in each photoelectric conversion element varies depending on the applied dose of radiation, and the amplitude of the electric signals is small particularly in a low radiation dose range. Thus, a wide dynamic range can not be secured.

Japanese Laid-Open Patent Publication No. 2009-219538 (hereinafter referred to as JP2009-219538A) discloses a technology for solving the above problem. According to the disclosed technology, attention has been focused on the fact that the amounts of bias currents flowing through bias lines from the photoelectric conversion elements in order to bias the photoelectric conversion elements vary depending on the dose of radiation applied to the photoelectric conversion elements. Based on the fact, the dose of radiation applied to the photoelectric conversion elements is calculated, and the gain of an amplifying circuit at the time electric signals are read from the photoelectric conversion elements is established based on the calculated dose of the radiation.

According to JP2009-219538A, for calculating the amounts of bias currents, the bias lines through which the bias currents for the respective photoelectric conversion elements flow are converged on a line, and a resistor having a large resistance value of 100 [k$\Omega$] or 1 [M$\Omega$] is connected in series to the line. Then, a voltage generated across the series-connected resistor is measured by a differential amplifier, because the bias currents are weak, i.e., in the order of microampere.

SUMMARY OF THE INVENTION

The photosensitivity (hereinafter referred to as "sensitivity") of a photoelectric conversion element changes depending on a bias voltage applied thereto. If the voltage drop across the resistor occurs, then the photosensitivity of the photoelectric conversion element is lowered, and the amplitude of the electric signal (voltage signal) is lowered accordingly. Thus, a wide dynamic range can not be secured.

It is an object of the present invention to provide a radiographic image detecting apparatus which is capable of obtaining an appropriate output electric signal even if the voltage drop occurs across the resistor for detecting the amount of bias current of the photoelectric conversion element, and a radiographic image capturing system which prevents the quality of radiographic images captured thereby from being degraded.

According to one aspect of the present invention, there is provided a radiographic image detecting apparatus comprising: a plurality of photoelectric conversion elements for generating electric charge by emission of radiation; a bias line through which a bias voltage is supplied to the photoelectric conversion elements; a power supply for applying the bias voltage to the photoelectric conversion elements through the bias line; a current detector for detecting a bias current flowing through the bias line based on a voltage drop across a resistor inserted in the bias line; a first amplifying circuit having a gain, wherein in a case where an electric signal due to the electric charge is read out from the photoelectric conversion elements through a signal line, the gain at a time of reading out the electric signal is set based on a current value detected by the current detector at a time of emission of the radiation; a second amplifying circuit connected to an output of the first amplifying circuit; and a controller for correcting the electric signal by increasing a gain of the second amplifying circuit depending on decrease in a sensitivity of the photoelectric conversion element due to the voltage drop.

In this case, the second amplifying circuit may comprise a non-inverting amplifying circuit which includes an operational amplifier having a non-inverting input connected to an output of the first amplifying circuit, a first resistor connected between an output of the operational amplifier and an inverting input of the operational amplifier, and a second resistor connected between the inverting input and a reference potential, and the controller may change a resistance value of at least one of the first and second resistors thereby to change the gain of the second amplifying circuit.

According to another aspect of the present invention, there is provided a radiographic image detecting apparatus comprising: a plurality of photoelectric conversion elements for generating electric charge by emission of radiation; a bias line through which a bias voltage is supplied to the photoelectric conversion elements; a power supply for applying the bias voltage to the photoelectric conversion elements through the bias line; a current detector for detecting a bias current flowing through the bias line based on a voltage drop across a resistor inserted in the bias line; an amplifying circuit having a gain, wherein in a case where an electric signal due to the electric charge is read out from the photoelectric conversion elements through a signal line, the gain at a time of reading out the electric signal is set based on a current value detected by the current detector at the time of emission of the radiation; and a controller for correcting the lowered electric signal depending on decrease in a sensitivity of the photoelectric conversion element due to the voltage drop.

In this case, the controller may correct the electric signal by changing the gain setting of the amplifying circuit.

Also, the controller may include a digital processing unit for correcting a digital value which is obtained by A-D conversion of the electric signal amplified by the amplifying circuit, such that the digital value becomes larger as the voltage drop becomes larger.

According to still another aspect of the present invention, there is provided a radiographic image detecting apparatus comprising: a plurality of photoelectric conversion elements for generating electric charge by emission of radiation; bias lines through which a bias voltage is supplied to the photoelectric conversion elements; a power supply for applying the bias voltage to the photoelectric conversion elements through the bias lines; a current detector for detecting a bias current flowing through at least one of the bias lines based on a voltage drop across a resistor inserted in the one bias line; a first amplifying circuit having a gain, wherein in a case where an electric signal due to the electric charge is read out, through a signal line, from the photoelectric conversion elements that are connected to the current detector, the gain at a time of reading out the electric signal is set based on a current value detected by the current detector at a time of emission of the radiation; a second amplifying circuit having a gain, wherein in a case where an electric signal due to the electric charge is read out, through the signal line, from the photoelectric conversion elements that are not connected to the current detector, the gain at a time of reading out the electric signal is set based on a current value detected by the current detector at a time of emission of the radiation; and a controller for correcting the lowered electric signal of the first amplifying circuit depending on decrease in a sensitivity of the photoelectric conversion elements due to the voltage drop.

In this case, the controller may correct the electric signal by changing the gain setting of the first amplifying circuit.

Also, the controller may include a digital processing unit for correcting a digital value which is obtained by A-D conversion of the electric signal of the first amplifying circuit, based on a digital value which is obtained by A-D conversion of the electric signal of the second amplifying circuit.

Further, each of the first amplifying circuit and the amplifying circuit may comprise a charge amplifier which includes an operational amplifier and a capacitance-value varying unit connected in parallel to the operational amplifier.

Further, the controller may detect start and/or end of emission of the radiation based on increase and decrease in a current flowing through the bias line detected by the current detector.

According to yet another aspect of the present invention, there is provided a radiographic image capturing system comprising: the radiographic image detecting apparatus as described above; and an image processor for forming a radiographic image based on electric signals which are read out from the photoelectric conversion elements and then amplified, the electric signals being output from the radiographic image detecting apparatus at the time of reading out the electric signal.

In this case, the radiographic image detecting apparatus and the image processor may be connected to each other by a wireless communication.

As described above, the present invention includes a first amplifying circuit having a gain, and a second amplifying circuit connected to an output of the first amplifying circuit. In a case where electric signals are read out from the photoelectric conversion elements, the gain of the first amplifying circuit at the time of reading the electric signals is set based on a current value detected by the current detector based on a voltage drop due to a bias current generated at the time of emission of radiation. The gain of the second amplifying circuit is increased depending on decrease in the sensitivity of the photoelectric conversion elements due to the voltage drop, thereby to obtain an appropriate output electric signal.

Also, the present invention includes a controller for correcting the amplitude of the lowered electric signal of the first amplifying circuit depending on decrease in the sensitivity of the photoelectric conversion elements due to the voltage drop across the resistor inserted in the bias line of the photoelectric conversion elements. Thus, the amplitude of the electric signal of the first amplifying element can be equalized with the amplitude of the electric signal of the second amplifying circuit whose sensitivity is not decreased because the resistor is not inserted in the bias line. Therefore, appropriate electric signals can be obtained from the photoelectric conversion elements.

Further, the present invention includes a radiographic image detecting apparatus as described above, and an image processor for forming a radiographic image based on electric signals which are read out from the photoelectric conversion elements and then amplified, the electric signals being output from the radiographic image detecting apparatus at the time of reading out the electric signal. Thus, it is possible to obtain a suitable radiographic image in which degradation of image quality is prevented.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Radiographic image detecting apparatus and radiographic image capturing systems according to preferred embodiments of the present invention will be described in detail below with reference to the accompanying drawings.

Figure 1:
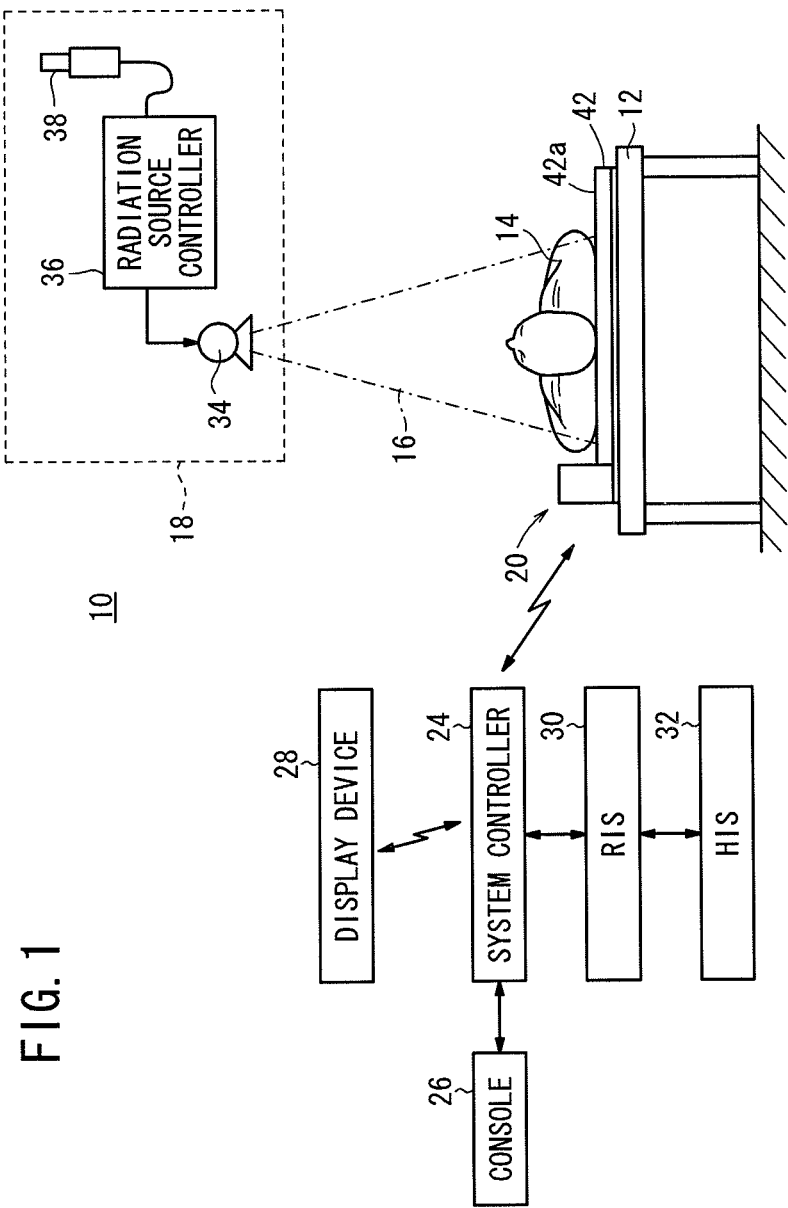
FIG. 1 is a schematic view, partly in block form, of a radiographic image capturing system according to an embodiment of the present invention.

FIG. 1 is a schematic view, partly in block form, of a radiographic image capturing system 10 according to an embodiment of the present invention.

As shown in FIG. 1, the radiographic image capturing system 10 includes a radiation apparatus 18 for applying radiation 16 to a subject 14 such as a patient lying on an image capturing base 12 such as a bed or the like, an electronic cassette (radiographic image detecting apparatus) 20 for detecting the radiation 16 that has passed through the subject 14 and converting the detected radiation into a radiographic image, a system controller 24 for totally controlling the radiographic image capturing system 10, the system controller 24 also functioning as an image processor, a console 26 for receiving input operations from the doctor or radiological technician (hereinafter referred to as "user"), and a display device 28 for displaying captured radiographic images, etc.

The system controller 24, the electronic cassette 20, and the display device 28 send signals to each other and receive signals from each other by way of a wireless LAN according to standards such as UWB (Ultra-Wide Band), IEEE802.11.a/b/g/n. or the like, or wireless communications using milliwaves. The system controller 24, the electronic cassette 20, and the display device 28 may send signals to each other and receive signals from each other by way of wired communications through cables.

The system controller 24 is connected to a radiology information system (RIS) 30 which generally manages radiographic image information handled by the radiological department of a hospital and other information. The RIS 30 is connected to a hospital information system (HIS) 32 which generally manages medical information in the hospital.

The radiation apparatus 18 has a radiation source 34 for emitting the radiation 16, a radiation source controller 36 for controlling the radiation source 34, and a radiation switch 38. The radiation source 34 applies the radiation 16 to the electronic cassette 20. The radiation 16 that is emitted from the radiation source 34 may be an X-ray, an α-ray, a β-ray, a γ-ray, an electron beam, or the like. The radiation switch 38 can be pushed in two strokes, i.e., it can be pushed in a half stroke and a full stroke. In a case where the radiation switch 38 is pushed in the half stroke by a user, the radiation source controller 36 makes the radiation source 34 ready to emit the radiation 16. In a case where the radiation switch 38 is pushed in the full stroke, the radiation source controller 36 causes the radiation source 34 to start emitting the radiation 16.

The radiation source controller 36 includes an input device, not shown, which can be operated by the user to set various values including an irradiation time of the radiation 16, a tube voltage and a tube current of the radiation source 34, etc. Based on the set values, the radiation source controller 36 controls the radiation source 34 to emit the radiation 16.

Figure 2:
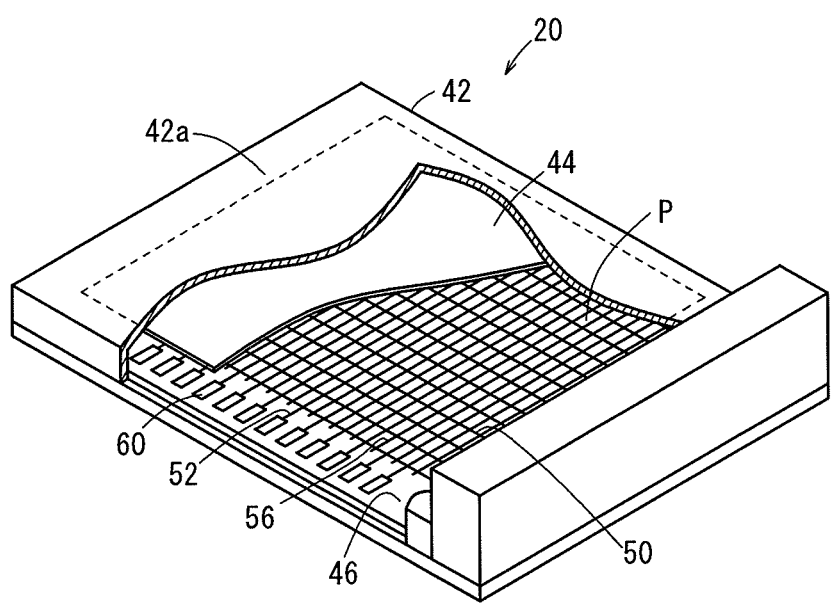
FIG. 2 is a perspective view, partly broken away, of a radiographic image detecting apparatus according to the embodiment.

FIG. 2 shows in perspective, partly broken away, the electronic cassette 20 shown in FIG. 1.

The electronic cassette 20 is in the form of a cassette-type apparatus including a scintillator 44, a substrate 46, and other components housed in a casing 42.

In the present embodiment, the electronic cassette 20 will be described as an indirect conversion radiographic image detecting apparatus wherein the scintillator 44 converts the applied radiation 16 (see FIG. 1) into an electromagnetic wave such as visible light or the like having a wavelength other than the wavelength of the radiation 16, and photoelectric conversion elements (radiation detection elements) 48, to be described later, generate electric charges in response to the electromagnetic wave applied thereto and convert the generated electric charges into electric signals. However, without the use of such a scintillator 44, the electronic cassette 20 may alternatively be a direct conversion radiographic image detecting apparatus wherein photoelectric conversion elements (radiation detection elements) directly generate electric charges in response to the radiation applied thereto and convert the generated electric charges into electric signals.

The casing 42 has a surface 42a irradiated with the radiation 16. At least the surface 42a of the casing 42 is made of carbon plate, plastic, or the like which is permeable to the radiation 16. The casing 42 houses therein the scintillator 44, the substrate 46, and other components. In the present embodiment, an antenna device, not shown, for sending information to and receiving information from the system controller 24 via a wireless link is embedded in a side wall of the casing 42, for example.

The scintillator 44 is bonded to a detector section P of the substrate 46. The scintillator 44, which is made mainly of a fluorescent material, converts the radiation applied thereto into an electromagnetic wave in a wavelength range from 300 to 800 nm, i.e., an electromagnetic wave mainly as visible light, and emits the electromagnetic wave.

Figure 3:
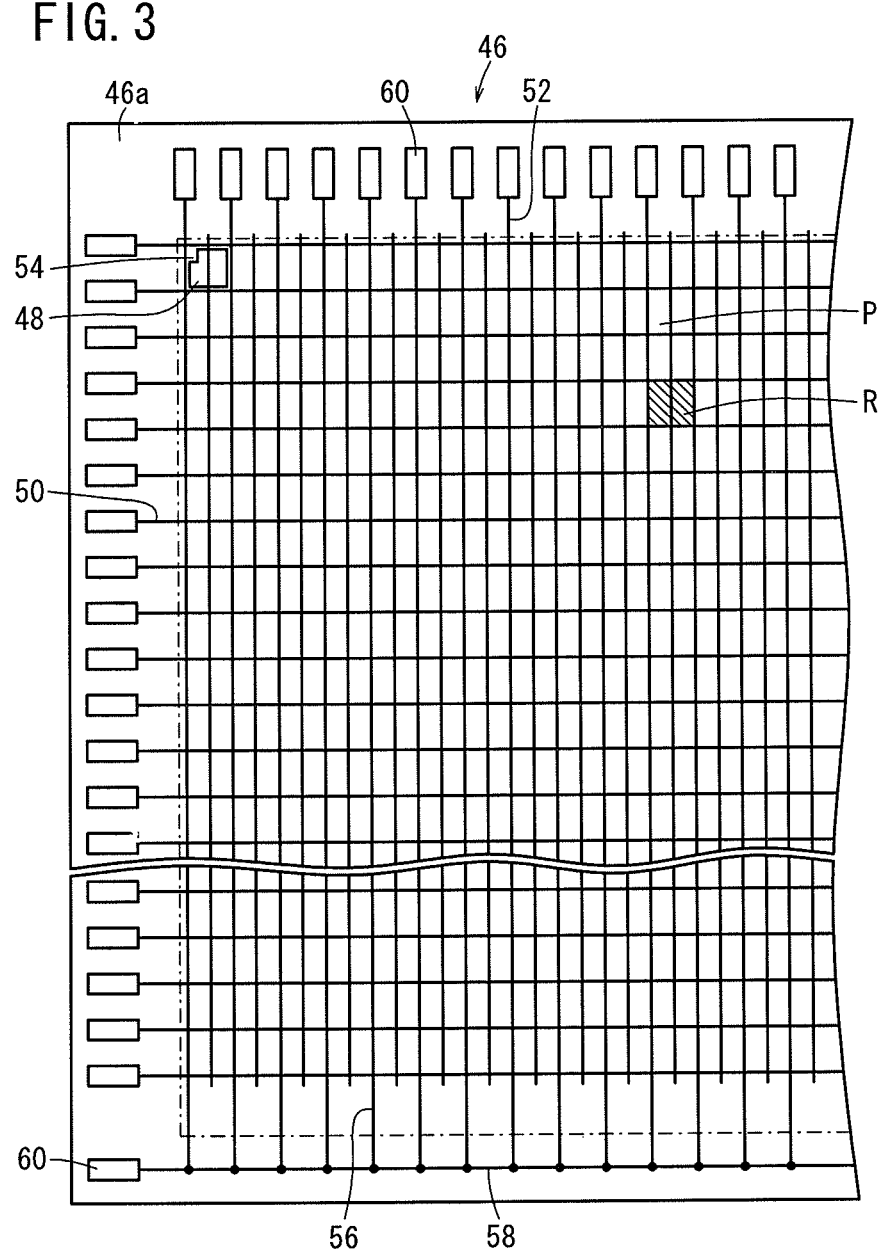
FIG. 3 is an enlarged fragmentary view of photoelectric transistors and thin-film transistors or the like in small areas on a substrate of the radiographic image detecting apparatus shown in FIG. 2.

The substrate 46 comprises a glass substrate. As shown in FIG. 3, a plurality of gate lines, i.e., scanning lines, 50 and a plurality of signal lines 52 are disposed on a surface 46a of the substrate 46 that faces the scintillator 44, such that the lines intersect one another. The gate lines 50 and the signal lines 52 on the surface 46a of the substrate 46 delimit a plurality of small areas R where the respective photoelectric conversion elements 48 are disposed. The overall areas R with the photoelectric conversion elements 48 disposed therein, i.e., a region indicated by the dot-and-dash lines in FIG. 3, serves as the detector section P. The photoelectric conversion elements 48 are arranged on the substrate 46 in a two-dimensional matrix.

Figure 4:
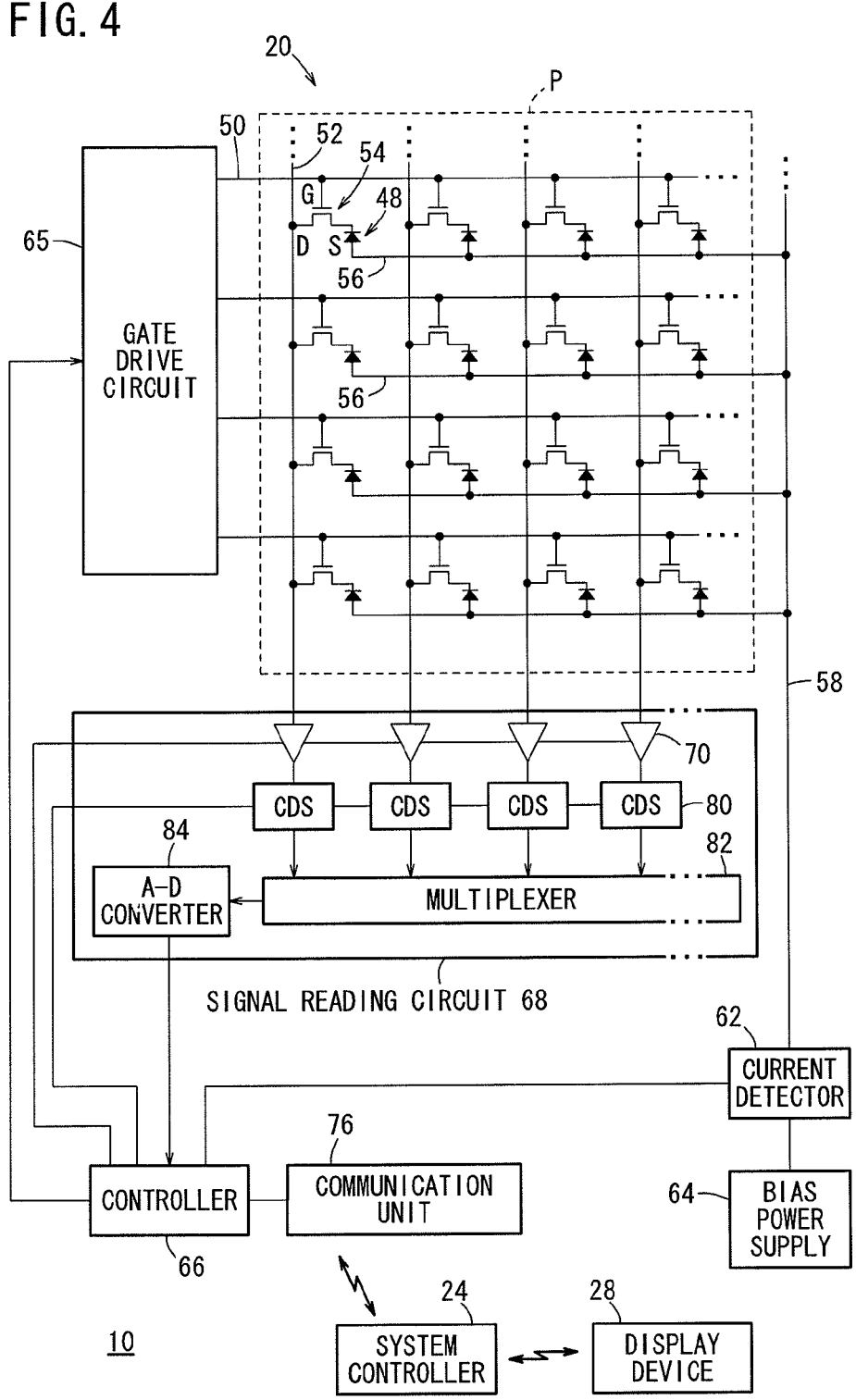
FIG. 4 is a circuit diagram, partly in block form, of the radiographic image capturing system according to the embodiment.

In the present embodiment, each of the photoelectric conversion elements 48 comprises a PIN photodiode. Alternatively, each of the photoelectric conversion elements 48 may comprise a phototransistor or the like. As shown in FIG. 4, each of the photoelectric conversion elements 48 is connected to a thin-film transistor (TFT) 54 serving as a switching device, which is connected to one of the signal lines 52.

As shown in FIG. 4, the TFT 54 has a gate electrode (hereinafter also referred to as "gate") G, which is made of Al, Cr, or the like, connected to one of the gate lines 50. The gate G and the gate line 50 are integrally deposited on the surface 46a of the substrate 46. A gate insulating layer made of silicon nitride (SiNx) or the like is deposited on the gate G and the surface 46a. The TFT 54 includes a source electrode (hereinafter also referred to as "source") S connected to the cathode electrode (hereinafter also referred to as "cathode") of the photoelectric conversion element 48 and a drain electrode (hereinafter also referred to as "drain") D formed integrally with one of the signal lines 52. The source S and the drain D are deposited on the gate insulating layer over the gate G. The structural details of the photoelectric conversion element 48 and the TFT 54 are known from JP2009-219538A, for example, and thus will not be described below. Though the substrate 46 comprises a glass substrate in the present embodiment, it may comprise a flexible substrate of synthetic resin.

The photoelectric conversion element 48 includes an anode electrode whose upper surface is connected to a bias line 56 which applies a reverse bias voltage to the photoelectric conversion element 48 through the anode electrode.

As shown in FIG. 4, a single bias line 56 is connected to each horizontal row of photoelectric conversion elements 48. The bias lines 56 connected to the corresponding rows of photoelectric conversion elements 48 extend parallel to the respective gate lines 50, and are connected to a single common line 58 (also referred to as a bias line or a common bias line) outside the detector section P. The bias lines 56 and the common line 58 comprise metal lines of small electric resistance.

The gate lines 50, the signal lines 52, and the common line 58 are connected to input/output terminals or pads 60 which are disposed on the substrate 46 near its marginal edges. Drive circuits etc. disposed on or connected to the substrate 46 are connected to the input/output terminals 60.

Incidentally, the electronic cassette 20 is formed as a portable apparatus powered by a rechargeable internal battery (electrical storage device).

Figure 5:
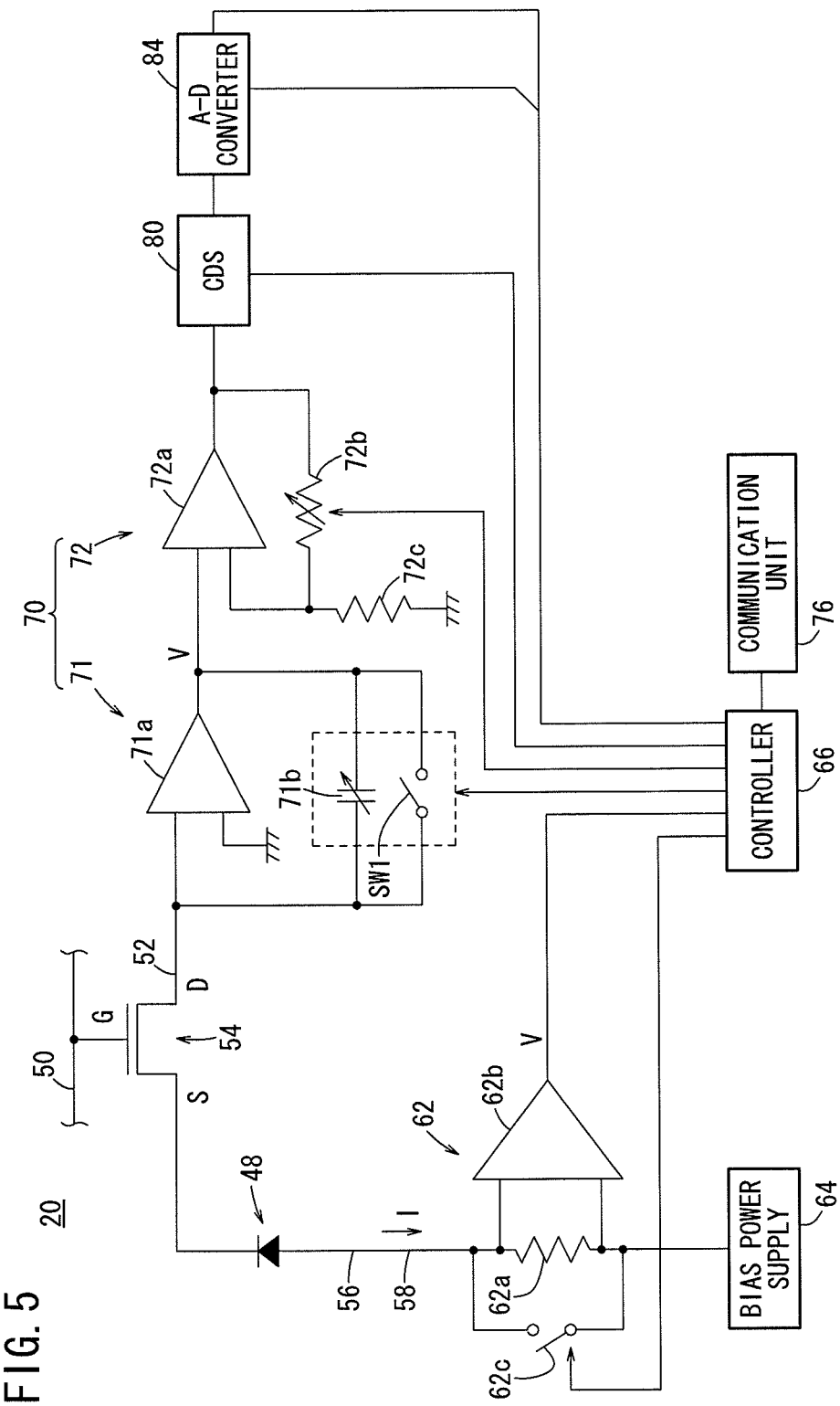
FIG. 5 is a circuit diagram, partly in block form, of a pixel of the radiographic image detecting apparatus according to the embodiment.

A circuit arrangement of the electronic cassette 20 will be described in detail below. FIG. 4 is an equivalent circuit diagram of the electronic cassette 20 according to the present embodiment, and FIG. 5 is an equivalent circuit diagram of one pixel of the detector section P of the substrate 46.

As described above, the anode electrode of each of the photoelectric conversion elements 48 in the detector section P is connected to one of the bias lines 56, which are connected to the single common line 58. The common line 58 is connected to a bias power supply (hereinafter also referred to as "power supply") 64 through a current detector (current detecting circuit) 62. The bias power supply 64 applies a reverse bias voltage Vbias to the photoelectric conversion elements 48 through the current detector 62, the common line 58, and the bias lines 56.

In the present embodiment, the bias lines 56 are connected to the P layers of the PIN photoelectric conversion elements 48 through the anode electrodes thereof, and the bias power supply 64 applies a negative voltage, which may be at least a predetermined voltage lower than the voltage applied to the cathode electrodes of the photoelectric conversion elements 48, as the reverse bias voltage to the anode electrodes of the photoelectric conversion elements 48 through the bias lines 56.

If the photoelectric conversion elements 48 have an inverse PIN stack structure with their polarity inverted and the bias lines 56 are connected to the cathode electrodes of the photoelectric conversion elements 48, then the bias power supply 64 applies a positive voltage, which may be at least a predetermined voltage higher than the voltage applied to the anode electrodes of the photoelectric conversion elements 48, as the reverse bias voltage to the cathode electrodes of the photoelectric conversion elements 48 through the bias lines 56. According to this modification, the photoelectric conversion elements 48 are connected to the bias power supply 64 in a reverse orientation with respect to the case of FIGS. 4 and 5.

As shown in FIGS. 4 and 5, the current detector 62 serves to detect a current flowing through the common line 58 which is connected to the bias lines 56. The current detector 62 includes a resistor 62a having a certain resistance value and which is connected in series to the common line 58, a difference amplifier 62b for measuring a voltage (voltage drop) V across the resistor 62a, and a switch 62c. The difference amplifier 62b measures the voltage (also referred to as a voltage value or voltage drop) V across the resistor 62a, whereby the electric current flowing through the common line 58 is converted into the voltage value V and detected.

Since the current flowing through the bias lines 56 and the common line 58 is weak, the resistor 62a of the current detector 62 has a large resistance value such as 100 [kΩ], 1 [MΩ] or the like, in order to obtain an effective voltage value V. Thus, the current detector 62 converts the electric current of the common line 58 into a voltage value V, and detects and outputs the voltage value V to the controller 66.

The controller 66 comprises a calculator including a micro computer. More specifically, the controller 66 includes a CPU (central processing unit); a ROM (including EEPROM) and a RAM (random access memory) serving as a memory; an input/output device such as an A-D converter, a D-A converter, etc.; a timer for timing; and the like. The CPU reads out and executes a program stored in the ROM, whereby the controller 66 can serve as various functions such as a controlling unit, a calculating unit, a correcting unit, a processing unit, etc.

Since such a large resistance value of the resistor 62a hinders electric current from flowing through the bias lines 56, the common line 58, etc. in a case where electric charges accumulated in the photoelectric conversion elements 48 in response to the application of radiation are read out, the current detector 62 includes the switch 62c for short-circuiting both the terminals of the resistor 62a at the time of reading electric charges.

The cathode electrodes of the photoelectric conversion elements 48 are connected to the respective source electrodes S of the TFTs 54, while the gate electrodes G of the TFTs 54 are connected to the corresponding gate lines 50 extending from the gate drive circuit (scanning drive circuit) 65. Also, the drain electrodes D of the TFTs 54 are connected to the corresponding signal lines 52.

Then, the gate drive circuit 65 applies a voltage for signal-readout, to the gate electrodes G of the TFTs 54 through the gate line 50 thereby to open the gates of the TFTs 54, and then electric charges stored in the photoelectric conversion elements 48, i.e., electric signals, are read out from the drain electrodes D to the signal lines 52 through the source electrodes S of the TFTs 54.

The signal lines 52 are connected to a signal reading circuit 68, more specifically to respective amplifying circuits 70 in the signal reading circuit 68. In the present embodiment, each amplifying circuit 70 includes a first amplifying circuit 71 for amplifying an electric signal read out from each photoelectric conversion element 48, and a second amplifying circuit 72 for correcting the amplitude of the electric signal amplified by the first amplifying circuit 71.

The first amplifying circuit 71 comprises a charge amplifying circuit. More specifically, the first amplifying circuit 71 includes an operational amplifier 71a, a variable capacitor (capacitance-value varying unit) 71b connected in parallel to the operational amplifier 71a, and a charge-reset switch SW1 for resetting electric charges and which is connected in parallel to the variable capacitor 71b. The capacitance value of the variable capacitor 71b is set by the controller 66.

Instead of the variable capacitor 71b, for example, the following structure may be adopted. That is, series circuits each having a fixed capacitor and a switch is connected in parallel to each other, so as to select the switches (for example, see FIG. 7 of JP2009-219538A).

The second amplifying circuit 72 comprises a variable-gain non-inverting amplifying circuit. More specifically, the second amplifying circuit 72 includes an operational amplifier 72a, a variable resistor (resistance-value varying unit) 72b connected in parallel to the operational amplifier 72a, and a resistor 72c connected between an inverting input of the operational amplifier 72a and a reference potential. The resistance value of the variable resistor 72b is set by the controller 66.

If the gate of the TFT 54 in the photoelectric conversion element 48 is opened (i.e., the voltage for signal-readout is applied to the gate electrode G of the TFT 54) under a condition where the charge-reset switch SW1 is turned off, the variable capacitor 71b accumulates therein electric charges read out from the photoelectric conversion element 48. Then, a voltage value V output from the operational amplifier 71a increases depending on the accumulated amount of the electric charges.

An electric current I flowing through the photoelectric conversion element 48 at the time of photoelectric conversion is stored in the controller 66, and the controller 66 controls the variable resistor 72b of the second amplifying circuit 72 such that the gain of the second amplifying circuit 72 for amplifying the voltage value V becomes large in proportion to the current value I at the time of reading of electric charges.

Incidentally, if the charge-reset switch SW1 is turned on, then the input of the first amplifying circuit 71 and the output thereof are short-circuited thereby to discharge the electric charges accumulated in the variable capacitor 71b.

In the present embodiment, the controller 66 has a table wherein the ranges of the voltage value output from the current detector 62 are associated with setting values of the variable capacitor 71b, whereby the gain of the first amplifying circuit 71 can be set (the capacitance value of the variable capacitor 71b can be set).

Further, the controller 66 has a table wherein the voltage values output from the current detector 62 are associated with the adjustment values of the variable resistor 72b. Owing to the table, the gain of the second amplifying circuit 72 can be set, i.e., the resistance value of the variable resistor 72b can be set.

Further, the controller 66 applies a charge reset signal to the charge-reset switch SW1, and thus controls ON and OFF of the charge-reset switch SW1.

Incidentally, the capacitance setting value of the variable capacitor 71b in the first amplifying circuit 71 is appropriately set based on performances or the like required for the electronic cassette 20. In the present embodiment, the charge-reset switch SW1 comprises an FET.

To the output terminal of the amplifying circuit 70, a correlated double sampling (hereinafter referred to as CDS) circuit 80 is connected. In the CDS circuit 80, CDS is performed as follows.

Before the gate of the TFT 54 in each photoelectric conversion element 48 is opened for signal-readout, the charge-reset switch SW1 is turned on to reset electric charges accumulated in each capacitor. Thereafter, the charge-reset switch SW1 is turned off into a stand-by state for signal-readout. In the state, the CDS circuit 80 first holds a voltage value (noise component) output from the output terminal of the amplifying circuit 70 at this stage due to a dark current or the like.

Then, the gate of the TFT 54 in each photoelectric conversion element 48 is opened, and electric signals are read out from the photoelectric conversion elements 48 and accumulated as electric charges in each of the selected capacitors. Thereafter, the gate of the TFT 54 is closed, and the CDS circuit 80 holds a voltage value (noise component+signal component) output from the output terminal of the amplifying circuit 70. The CDS circuit 80 calculates the difference between the above two voltage values, and eliminates the noise component based on the calculated difference. Then, the CDS circuit 80 outputs the analogue value (signal component) of the electric signals derived from the photoelectric conversion element 48. Thus, the CDS circuit 80 reduces the noise generated at the time of resetting of the capacitors.

The electric signals output from the CDS circuit 80 are sequentially delivered to the A-D converter 84 through a multiplexer 82 (see FIG. 4), and converted into digital values by the A-D converter 84. The A-D converter 84 sequentially outputs the electric signal, which is the above converted digital value, of each photoelectric conversion element 48 to the controller 66.

The controller 66 controls ON/OFF of the bias power supply 64 for supplying a reverse bias voltage to the photoelectric conversion elements 48, and also controls other units including unillustrated other devices and circuits, although illustration thereof is omitted in FIGS. 4 and 5. Further, a communication unit 76 is connected to the controller 66.

Figure 6:
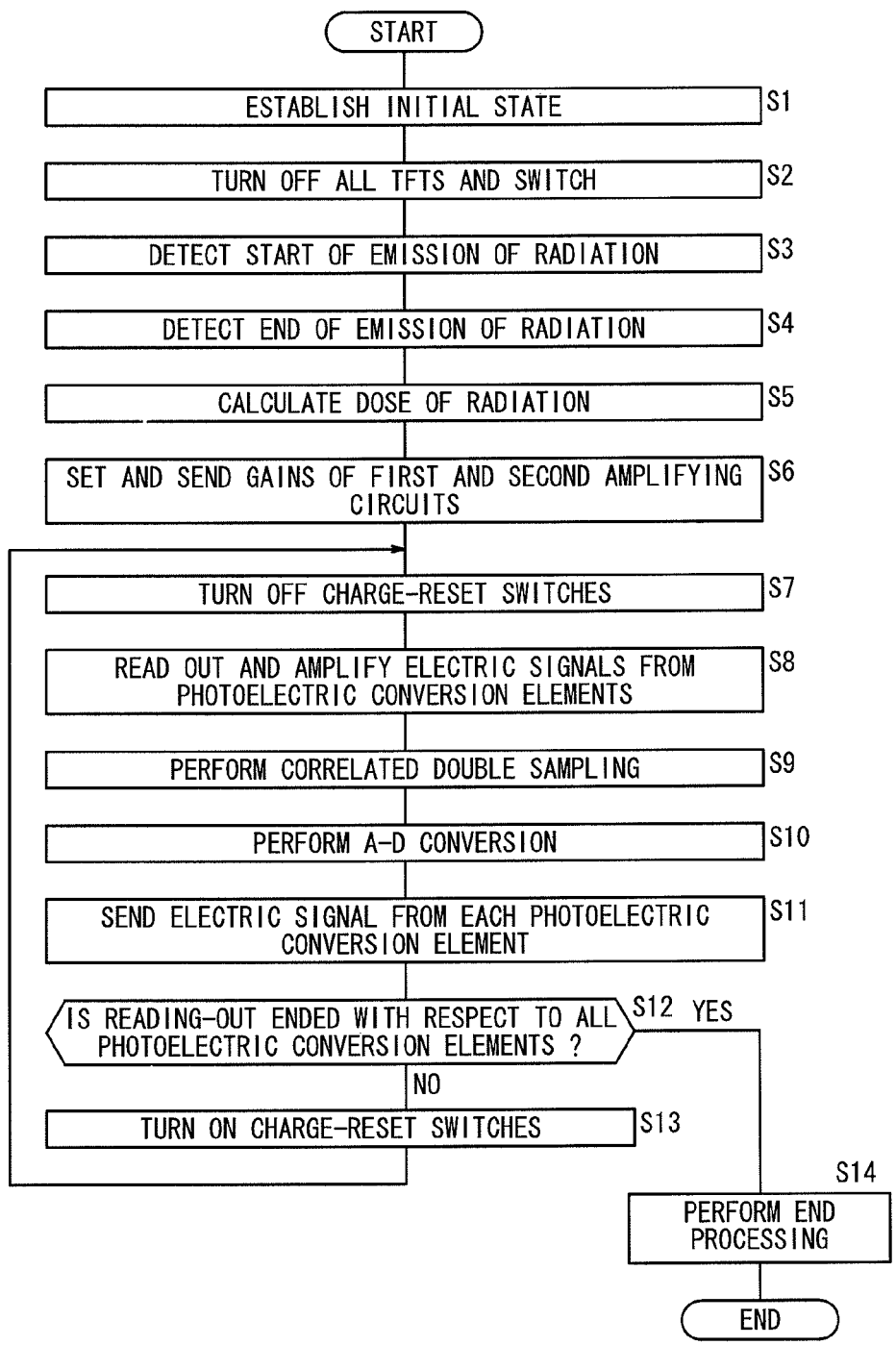
FIG. 6 is a flowchart of an operation sequence of a controller of the radiographic image detecting apparatus according to the embodiment.

Next, operation of the radiographic image capturing system 10, which is basically constructed as above, will be described below, and also an operational sequence for control by the controller 66 will be described below with reference to the flowchart shown in FIG. 6. Together therewith, operation of the electronic cassette 20 according to the embodiment of the present invention will be described below.

First, the console 26 judges whether or not an image-capturing region and a diagnosing region have been selected by operation of an unillustrated input unit by the user. In this case, the system controller 24 displays an image for selection of the image-capturing region and diagnosing region, on the display device 28. The user can select an image-capturing region and a diagnosing region of a patient (subject 14) to be imaged from now, while the user watches the displayed image.

If the console 26 judges that the image-capturing region and the diagnosing region have been selected by the user, then the system controller 24 reads out image-capturing conditions depending on the selected image-capturing region and diagnosing region, from the table of its own database, and establishes the read image-capturing conditions as image-capturing conditions for a radiographic image capturing process to be performed from now. Incidentally, the system controller 24 may display the established image-capturing conditions on the display device 28. In this case, the user can visually confirm contents of the established image-capturing conditions.

In order to emit radiation 16 from the radiation source 34 under the established image-capturing conditions, the user operates the unillustrated input unit provided on the radiation source controller 36 thereby to set the same image-capturing conditions as the image-capturing conditions established in the system controller 24, in the radiation source controller 36. For example, by providing the radiation apparatus 18 with the same table, the user may select the image-capturing region and diagnosing region so as to set the same image-capturing conditions. Alternatively, the user may directly input the tube voltage, the irradiation time, the tube current, mAs value, etc.

Thereafter, the system controller 24 transmits an activation signal to the communication unit 76 of the electronic cassette 20 through its own communication unit (not shown), to activate the electronic cassette 20.

Prior to emission of radiation 16 from the radiation apparatus 18, the controller 66 of the electronic cassette 20 turns on the charge-reset switches SW1 of all the amplifying circuits 70. Also, the controller 66 controls the gate drive circuit 65 to apply voltage for signal-readout, to the gate electrodes G of the TFTs 54 in all the photoelectric conversion elements 48, through the gate lines 50, whereby all the TFTs 54 are brought into an ON state.

At the same time, the controller 66 turns on the switch 62c for short-circuiting both the terminals of the resistor 62a in the current detector 62. Thus, unnecessary electric charges accumulated in the photoelectric conversion elements 48, the signal lines 52, the variable capacitors 71b, the bias lines 56, the current detector 62, etc. are discharged and eliminated, whereby an initial state is established (step S1).

Next, the controller 66 stops application of the voltage for signal-readout to the gate electrodes G of the TFTs 54 in all the photoelectric conversion elements 48 thereby to bring all the TFTs 54 into an OFF state, and also turns off the switch 62c in the current detector 62 (step S2).

In this state, the controller 66 monitors the state of the current detector 62, and detects start of emission of the radiation 16 based on pushing-down of the radiation switch 38 by the user (step S3). Then, the controller 66 detects end of emission of the radiation 16 according to the irradiation time predetermined depending on the image-capturing region and diagnosing region (step S4). During the period from the start of emission of the radiation 16 until the end of emission of the radiation 16, the radiographic image capturing process is performed with respect to the subject 14.

Incidentally, information or signals about the start of emission of the radiation 16 and the end of emission thereof may be acquired and used from the radiation source 34 for applying the radiation 16 to the electronic cassette 20 through the subject 14 such as a human body or from the radiation source controller 36 for controlling the radiation source 34. Even in such a case, the present invention is applicable to the radiographic image detecting apparatus and the radiographic image capturing system incorporating the same.

In the present embodiment, by using information of a current value I from the current detector 62, which is used for gain adjustment (to be described later) of the amplifying circuit 70, the electronic cassette 20 detects the start of emission of the radiation 16 and the end of emission of the radiation 16 by itself. Next, detection of the start and end of emission of the radiation 16, and the gain adjustment of the amplifying circuit 70 will be described below.

In the present embodiment, if a reverse bias voltage, i.e., a negative voltage, is applied to the anode electrodes of the photoelectric conversion elements 48 as shown in FIG. 4 through the bias lines 56, then a potential gradient is generated in the photoelectric conversion element 48. In this state, radiation 16 is emitted from the radiation source 34. The scintillator 44 receives the emitted radiation 16, and converts the radiation 16 into electromagnetic wave. The converted electromagnetic wave is applied to the photoelectric conversion elements 48, and then electron-hole pairs are generated in the photoelectric conversion elements 48.

Of the generated electron-hole pairs, electrons move toward each cathode electrode having a high potential, according to the potential gradient. However, since each gate of the TFT 54 is closed, the electrons are accumulated near the cathode electrode. Thus, each photoelectric conversion element 48 accumulates the amount of electrons depending on the applied amount of electromagnetic wave.

On the other hand, of the generated electron-hole pairs, holes move toward each anode electrode having a low potential according to the potential gradient, and then move through each anode electrode into the corresponding bias line 56. As shown in FIGS. 4 and 5, the holes flowing from the photoelectric conversion elements 48 through the bias lines 56 are detected as an electric current by the current detector 62.

That is, the holes flow in the bias lines 56 at the same amount as that of the electrons accumulated in the photoelectric conversion elements 48 depending on the applied amount of electromagnetic wave. The currents flowing in the bias lines 56 are converged into the common line 58, and the converged current flows toward the current detector 62 through the common line 58.

In a stage before application of radiation, i.e., in a stage where no radiation 16 or electromagnetic wave enters the photoelectric conversion elements 48, ideally, no current flows in the bias lines 56 or the common line 58, but actually, a dark current is generated in the photoelectric conversion elements 48, and weak electric current is detected by the current detector 62.

Figure 7:
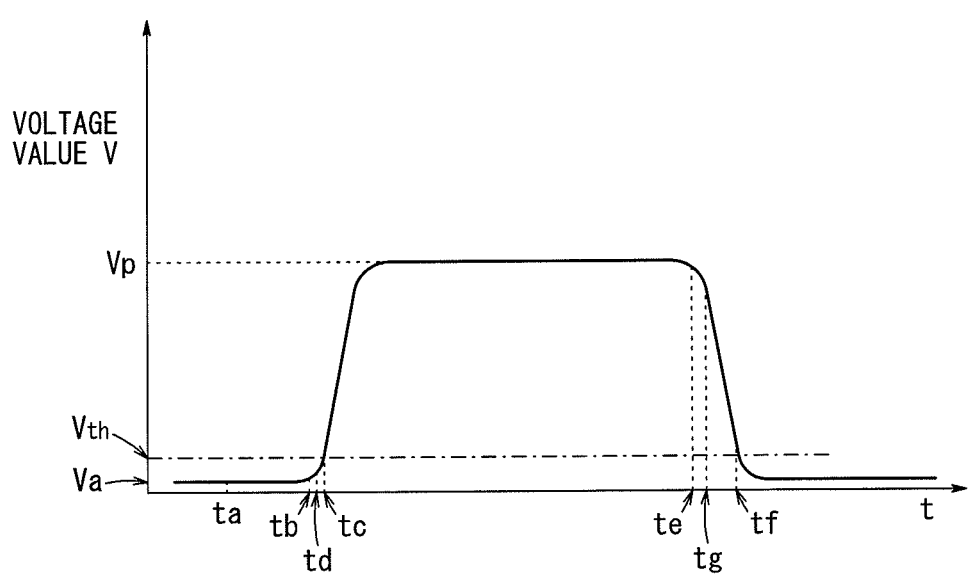
FIG. 7 is a graph showing by way of example the manner in which a voltage converted from a current by a current detector and output therefrom changes with time.

As described above, in the present embodiment, since the current detector 62 converts electric current flowing in the common line 58 into a voltage value and outputs the voltage value V, even in the stage before application of radiation where no radiation 16 or electromagnetic wave enters the photoelectric conversion elements 48, as shown in FIG. 7 at time point ta, a voltage value Va, which is weak but not zero, is input from the current detector 62 to the controller 66.

The radiation source 34 starts to emit radiation 16. Then, electron-hole pairs are generated in each photoelectric conversion element 48, and holes move to the current detector 62 through the bias lines 56 and the common line 58. Thus, at time point tb as shown in FIG. 7, the voltage value V output from the current detector 62 increases. In the present embodiment, the controller 66 detects that the voltage value V output from the current detector 62 starts to increase, whereby the controller 66 detects the start of emission of the radiation 16 (step S3).

Figure 11:
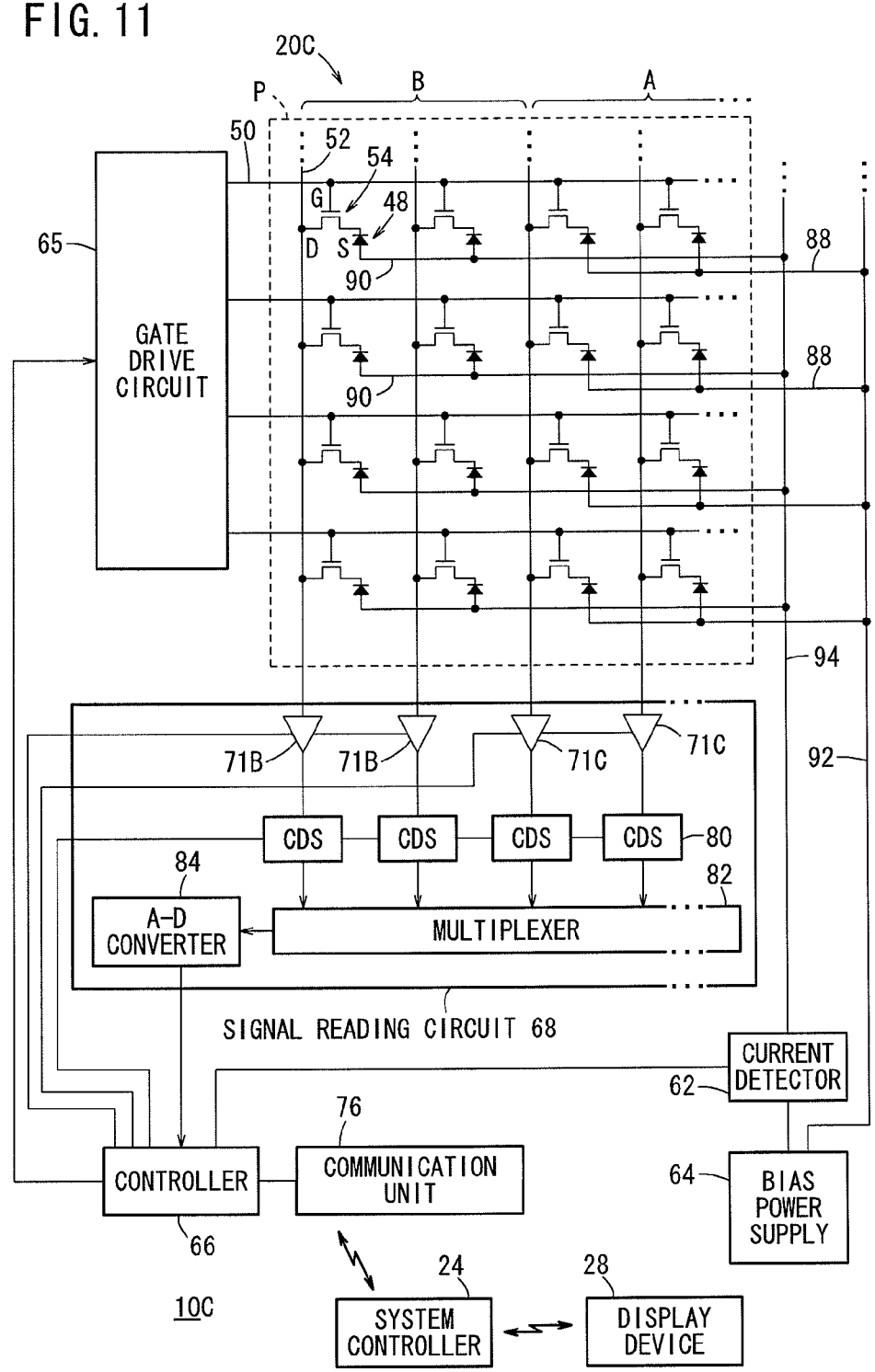
FIG. 11 is circuit diagram of a radiographic image capturing system according to a third modification of the present invention.

The current detector 62 may detect that the voltage value V exceeds a predetermined threshold value Vth. In this case, the current detector 62 detects that emission of radiation 16 is started at time point tc as shown in FIG. 11. Alternatively, the current detector 62 may detect that the temporal differentiation value of the voltage value V exceeds a predetermined threshold value. In this case, the current detector 62 detects that emission of radiation 16 is started at time point td as shown in FIG. 11.

The emission of the radiation 16 from the radiation source 34 is completed, whereupon generation of electron-hole pairs is stopped in each photoelectric conversion element 48, and then supply of holes to the bias lines 56 is also stopped. As a result, at time point to as shown in FIG. 7, the voltage value V output from the current detector 62 starts to decrease. In the present embodiment, the controller 66 detects that the voltage value V output from the current detector 62 decreases, whereby the controller 66 detects the end of emission of radiation 16 (step S4).

The current detector 62 may detect that the voltage value V falls below a predetermined threshold value Vth. In this case, the current detector 62 detects that emission of radiation 16 is ended at time point tf as shown in FIG. 11. Alternatively, the current detector 62 may detect that the temporal differentiation value of the voltage value V falls below a predetermined negative threshold value. In this case, the current detector 62 detects that emission of radiation 16 is ended at time point tg as shown in FIG. 11. In the present embodiment, time point tc is regarded as the start point of emission of radiation 16, time point tf is regarded as the end point of emission of the radiation 16.

As described above, electron-hole pairs are generated in proportion to the number of photons of radiation 16 or electromagnetic wave applied to the photoelectric conversion elements 48, and holes flow from the photoelectric conversion elements 48 into the bias lines 56 depending on the applied amount of electromagnetic wave. Thus, by measuring the total amount of current flowing through the common line 58, it is possible to determine the dose of the radiation 16 applied to the electronic cassette 20 from the start of emission of the radiation 16 until the end of emission of the radiation 16.

In the present embodiment, in order to determine the dose of the radiation 16 more easily, the controller 66 includes a peak-hold function. Thus, the controller 66 determines the dose of the applied radiation 16 based on the time interval tf-tc between the start and end of emission of the radiation 16, and the peak value of current flowing through the common line 58 detected by the current detector (step S5).

More specifically, the controller 66 detects the peak value Vp of the voltage value detected between the start point tc of emission and the end point tf of emission. Then, the controller 66 calculates an approximate value M of the dose of the radiation 16 applied to the electronic cassette 20 according to the equation (1), i.e., based on a value obtained by multiplying the peak value Vp by a value obtained by subtracting a constant α from the time interval tf-tc between start and end of emission of the radiation 16. In the equation (1), "a" is a constant.

$$M = a \times Vp \times (tf - tc - \alpha) \quad (1)$$

In the determination of the approximate value M, the voltage value V from the rising edge after the start point tc of emission until the falling edge before the end point tf of emission in FIG. 7 is regarded as a rectangular shape, and then the approximate value M of the dose of the radiation 16 is determined as a value proportion to the area of the rectangular shape. Thus, advantageously, it is possible to easily calculate the dose of the radiation 16 simply by detecting the start point tc and the end point tf, and the peak value Vp.

Incidentally, by using an integrating circuit or the like, the integral value of the voltage value V (or a value obtained by subtracting a constant value corresponding to noise from the voltage value V) from the start point tc of emission until the end point tf of emission as shown in FIG. 7 may be calculated thereby to determine the dose of the radiation 16 applied to the electronic cassette 20. In this case, it is possible to calculate the dose of the radiation 16 more precisely.

Also, in order to eliminate the noise component more accurately, the integrating circuit or the like may be equipped with a bandpass filter, which passes data having frequencies within a certain range and rejects (attenuates) data having frequencies outside the certain range. In this case, the voltage value corresponding to the current value output from the current detector 62 can be subjected to a bandpass filtering process and integrated, thereby to determine the dose of the radiation 16.

Next, the controller 66 sets the gains of the first amplifying circuit 71 and the second amplifying circuit 72 at the time of reading of the electric signals from the photoelectric conversion elements 48 based on the calculated dose (or the approximate value M) of the radiation 16 (step S6).

In the present embodiment, the controller 66 contains, in an unillustrated memory, a table where the thus-calculated dose of the radiation 16 is associated with the gain of the first amplifying circuit 71, i.e., the total value of the capacitance of the variable capacitor 71b in the first amplifying circuit 71. For example, the capacitance is set in the range from 0.5 [pF] to 4 [pF] in increments of 0.5 pF (i.e., 8 steps).

Thus, in the table, the dose of the radiation 16 is divided into eight steps depending on its magnitude, and a certain capacitance value of the variable capacitor 71b is associated with each step. In the table, as the dose of the radiation 16 is larger, the set gain of the first amplifying circuit 71 is lower.

The controller 66 determines the dose of the radiation 16, and then adjusts the gain of the first amplifying circuit 71 with reference to the table.

On the other hand, at the same time of the adjustment of the gain of the first amplifying circuit 71, the controller 66 adjusts the gain of the second amplifying circuit 72.

In the gain adjustment for the second amplifying circuit 72, assuming that, for example, the bias voltage value of the bias power supply 64 is represented by Vbias, the sensitivity correction value Sc can be determined according to the following expression (2) based on the fact that the sensitivity (the accumulated amount of charges/the applied amount of radiation) is substantially proportional to the bias voltage value Vbias.

$$Sc = Vbias / (Vbias - Vp) \quad (2)$$

That is, since the gain adjustment for the second amplifying circuit 72 is the sensitivity adjustment (sensitivity correction), the gain may be multiplied by Vbias/(Vbias−Vp), based on the detected peak value Vp.

The controller 66 sends information of the above-set gains of the first and second amplifying circuits 71, 72 to the system controller 24 through the communication unit 76 (see FIG. 4) (step S6).

Next, the controller 66 performs a normal readout process for reading out the electric signal from each photoelectric conversion element 48. Prior to the readout process, the controller 66 turns on the switch 62c of the current detector 62, whereby the controller 66 can perform the readout process without the influence of the resistor 62a of the current detector 62.

Figure 8:
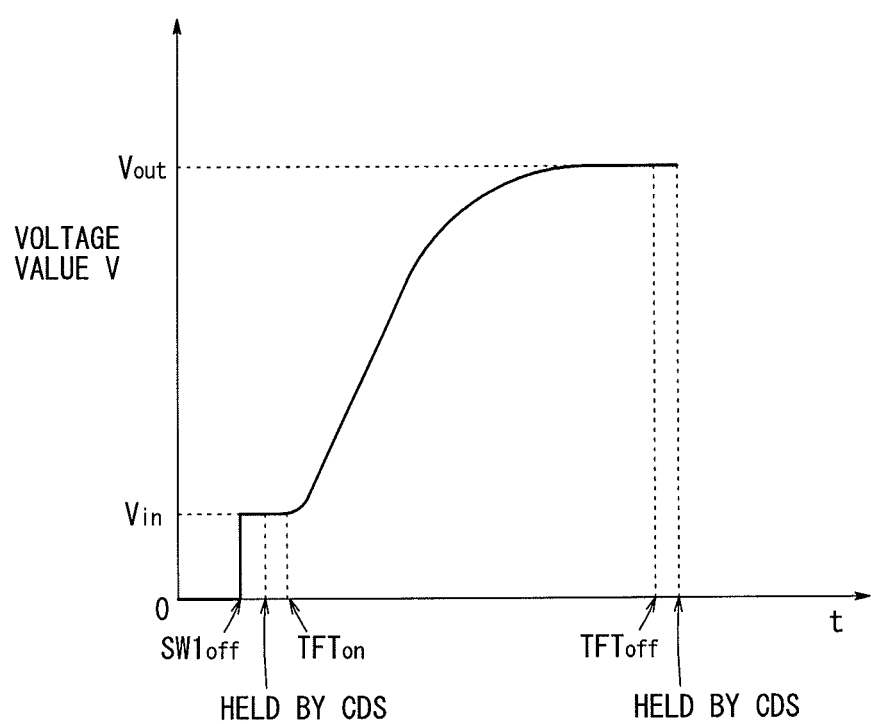
FIG. 8 is a graph showing by way of example the manner in which a voltage output from an amplifying circuit changes with time.

In this condition, the controller 66 turns off the charge-reset switch SW1 of each amplifying circuit 70 (step S7), and then sends a signal to the CDS circuit 80. The CDS circuit 80, which has received the signal, holds the voltage value Vin output from the amplifying circuit 70 at this stage, as shown in FIG. 8.

Then, the controller 66 controls the gate drive circuit 65 (see FIG. 4) to apply the voltage for signal-readout, to one of the gate lines 50, thereby to open the gates of TFTs 54 whose gate electrodes G are connected to the one gate line 50. Then, electric charges (electrons in the present embodiment) accumulated in photoelectric conversion elements 48 that are connected to the above TFTs 54 are read out as electric signals into the signal lines 52, and the electric signals are amplified by the first amplifying circuits 71 where the gains are set in the above manner, and the amplitude of the amplified electric signals are corrected by the second amplifying circuits 72 (step S8).

Subsequently, after electric charges are accumulated in the variable capacitor 71b of each first amplifying circuit 71, the controller 66 outputs, to the gate drive circuit 65, a signal for applying a voltage for non-readout of signal (i.e., for holding the signal) to the gate line 50, thereby to close the gate of each TFT 54. The above signal is also sent to the CDS circuit 80. The CDS circuit 80, which has received the signal, holds the voltage value Vout output from the amplifying circuit 70 at this stage, as shown in FIG. 8. Then, the CDS circuit 80 calculates the difference between Vout and Vin (Vout−Vin) (correlated double sampling process), and outputs the calculated difference (step S9).

The electric signal, i.e., the difference Vout−Vin, output from each CDS circuit 80 is sequentially sent to the A-D converter 84 through the multiplexer 82 (see FIG. 4), that is, the electric signal for each photoelectric conversion element 48 is sent to the A-D converter 84, and then sequentially converted into a digital value by the A-D converter 84 (step S10).

The A-D converter 84 sends the electric signal of each photoelectric conversion element 48, and then the controller 66 sequentially sends the electric signal to the system controller 24 through the communication unit 76 (step S11). At this time, the electric signal from each photoelectric conversion element 48 may be stored in the unillustrated memory disposed in or connected to the electronic cassette 20. Also, all data may be stored in the memory and sent in a lump at the time of an ending process.

Next, if reading of electric signals is not ended with respect to all the photoelectric conversion elements 48 (step S12; NO), then the controller 66 turns on the charge-reset switch SW1 of each first amplifying circuit 71 (step S13), thereby to discharge and eliminate the electric charges accumulated in the variable capacitor 71b of each first amplifying circuit 71. Thereafter, the controller 66 turns off the charge-reset switch SW1 of each amplifying circuit 70, and then the processes from step S7 are repeated with respect to another gate line 50 through which the voltage for signal-readout is applied from the gate drive circuit 65.

If application of the voltage for signal-readout is ended with respect to all the gate lines 50 and readout of electric signals is ended with respect to all the photoelectric conversion elements 48 (step S12; YES), then the controller 66 performs necessary processes such as a process for discharging remaining electric charges in each photoelectric conversion element 48, each amplifying circuit 70, etc. (step S14), and puts an end to the processes.

[Radiographic Image Capturing System]

As shown in FIGS. 1 and 4, the radiographic image capturing system 10 according to the present embodiment comprises the above electronic cassette 20, and the system controller 24.

Radiographic image capturing process by use of the electronic cassette 20 has been completed, and then the gains of the first and second amplifying circuits 71, 72 are set. Electric signals are read out from the photoelectric conversion elements 48, and information of each electric signal is sequentially sent through the communication unit 76. The information is input to the system controller 24.

The system controller 24 performs necessary image processing on the received information of the electric signals, and arranges the information of the electric signals in accordance with the arrangement of the photoelectric conversion elements 48 in the electronic cassette 20, thereby to produce a radiographic image. In accordance with operation input through the console 26, the obtained radiographic image is displayed on the display device 28, or the radiographic image is recorded in an image recording medium such as a film, etc. by an unillustrated imager, for example.

As described above, in the electronic cassette 20 according to the present embodiment, radiation 16 or electromagnetic wave converted from the radiation 16 is applied to the photoelectric conversion elements 48, whereupon electron-hole pairs are generated in the photoelectric conversion elements 48. Of the generated electron-hole pairs, one type of electric charges are accumulated in the photoelectric conversion elements 48, while the other type of electric charges flow in the bias lines 56. In this case, the electric charges flow out from the photoelectric conversion elements 48 at the amount corresponding to the applied amount of radiation 16 or electromagnetic wave.

Thus, by measuring the electric current due to the electric charges flowing into the bias lines 56, it is possible to determine the actual dose of the radiation 16 applied to the electronic cassette 20 exactly. Based on the exactly-determined dose of the radiation 16, the gain of the first amplifying circuit 71 can be set appropriately, and further the correction gain of the second amplifying circuit 72 can be set appropriately.

Also, it is not necessary to perform pre-readout of electric signals such as a nondestructive readout. Since at the same time of application of radiation 16, the dose thereof is detected thereby to set the gains of the first and second amplifying circuits 71, 72, it is possible to start reading of electric signals immediately after the application of the radiation 16. Thus, it is possible to prevent increase in noise due to dark current or the like which increases with time, and then decrease in signal-to-noise ratio can be avoided.

Further, it is not necessary to perform pre-readout of electric signals such as a nondestructive readout. Since radiographic image capturing process can be started immediately, wasteful consumption of electricity due to pre-reading of electric signals can be prevented.

Also, since end of emission of radiation 16 is detected based on decrease in electric current detected by the current detector 62, even if information of the end of emission of the radiation 16 is not input externally, the electronic cassette 20 can detect the end of emission of the radiation 16 by itself, and start reading of electric signals immediately after the application of the radiation 16.

With the radiographic image capturing system 10 according to the present embodiment, as described above, in the electronic cassette 20, it does not take long to start image-capturing process, and reading of electric signals is started immediately after the completion of the image capturing process, whereby decrease in signal-to-noise ratio is prevented.

Also, since the obtained electric signals are amplified under a condition where the gain of each amplifying circuit 70 (first and second amplifying circuits 71, 72) is appropriately set, noise is reduced and dynamic range is secured. Thus, it is possible to obtain a suitable radiographic image having a high image quality.

Further, in the electronic cassette 20, the first amplifying circuit 71 comprises an operational amplifier 71a and a variable capacitor 71b connected in parallel to the operational amplifier 71a, and the gain of the first amplifying circuit 71 is set, and thus the gain of the first amplifying circuit 71 can be set easily and appropriately. Similarly, the second amplifying circuit 72 comprises an operational amplifier 72a, a variable resistor 72b connected in parallel to the operational amplifier 72a, and a resistor 72c connected between a reference potential and an inverting input, and the gain of the second amplifying circuit 72 is set, and thus the gain of the second amplifying circuit 72 can be set easily and appropriately.

Further, since the gains of the first and second amplifying circuits 71, 72 are easily set, it is possible to set the gains of the first and second amplifying circuits 71, 72 immediately after the completion of radiographic image capturing.

Also, the CDS circuit 80 eliminates noise component according to correlated double sampling technique. Thus, noise such as thermal noise, etc. of at least the capacitor of each amplifying circuit 70 can be eliminated appropriately, and thus signal-to-noise ratio of the obtained radiographic image can be enhanced.

Also, since the start of emission of radiation 16 and the end of emission of radiation 16 are detected based on increase and decrease in the electric current flowing through the bias lines 56, even if the radiographic image detecting apparatus does not acquire information about the start of emission and the end of emission from the radiation source or the like, the start and end of emission of radiation 16 can be detected exactly, and the dose of the applied radiation 16 can be detected exactly.

[First Modification]

In the electronic cassette 20 according to the above embodiment, a technique has been described in which, in a case where a bias current causes a voltage drop across the resistor 62a of the current detector 62, and due to the voltage drop, the bias voltage applied to the photoelectric conversion element 48 decreases, thereby resulting in the lowered sensitivity of the photoelectric conversion element 48, a correcting process is performed by setting the gain of the second amplifying circuit 72 comprising a non-inverting amplifying circuit, according to the above expression (2).

Figure 9:
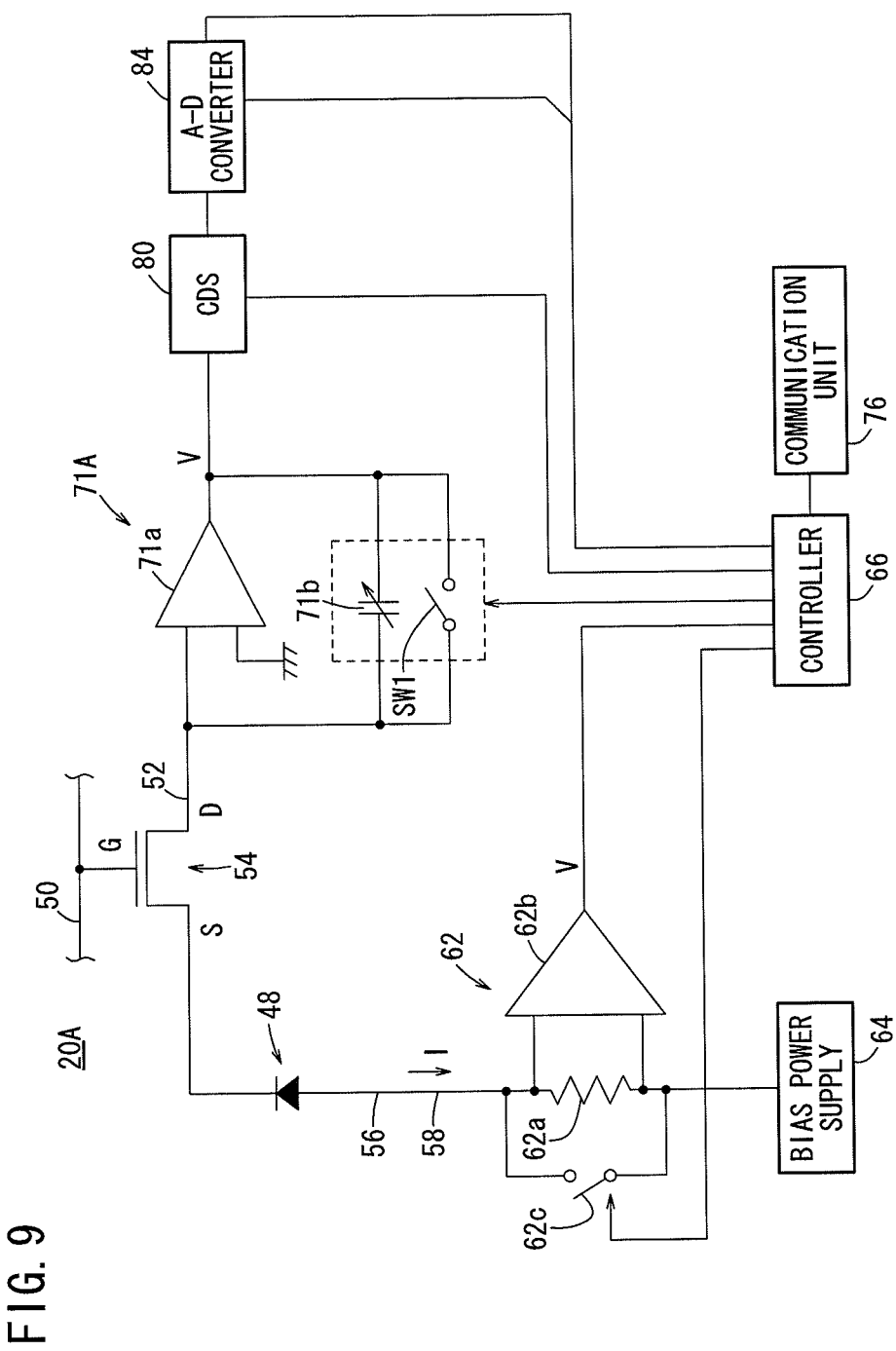
FIG. 9 is a circuit diagram of a radiographic image detecting apparatus according to a first modification of the present invention.

According to the first modification, the electronic cassette may be formed as an electronic cassette 20A shown in FIG. 9. In the electronic cassette 20A, in light of the fact that the gain of the first amplifying circuit 71 and the gain of the second amplifying circuit 72 are set at the same time, the first and second amplifying circuits 71, 72 are integrated into a single third amplifying circuit 71A (having the same circuit configuration as the first amplifying circuit 71), and the gain obtained by multiplying the gains of the first and second amplifying circuits 71, 72 by each other is set in the third amplifying circuit 71A by the controller 66, i.e. the capacitance value of the variable capacitor 71b is variably set.

[Second Modification]

Figure 10:
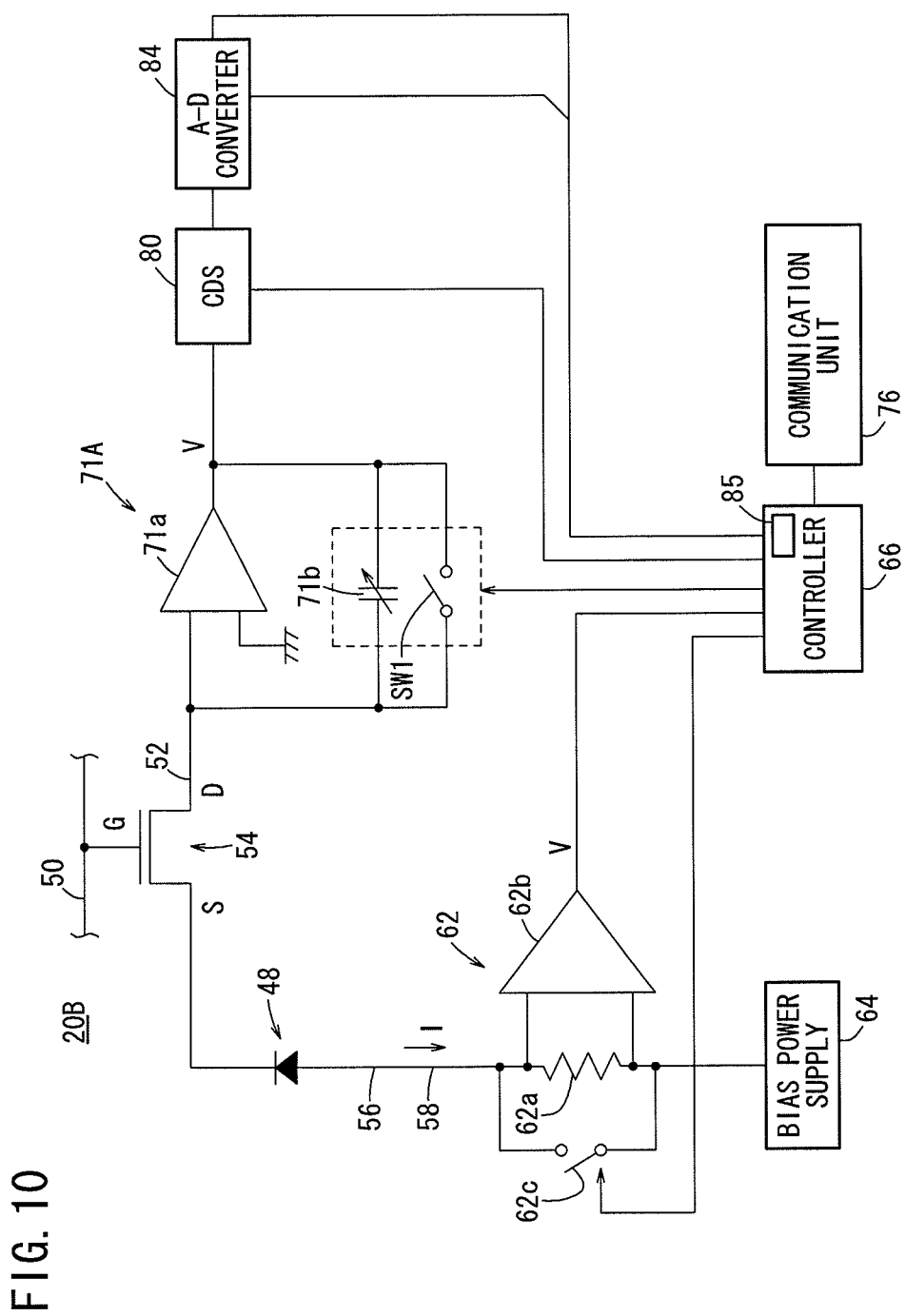
FIG. 10 is a circuit diagram of a radiographic image detecting apparatus according to a second modification of the present invention.

According to the second modification, in an electronic cassette 20B as shown in FIG. 10, the third amplifying circuit 71A (having the same circuit configuration as the first amplifying circuit 71) and the CDS circuit 80 are directly connected to each other without the second amplifying circuit 72, and a first digital multiplier (digital processing unit) 85 is provided at a subsequent stage of the A-D converter 84. In the second modification, the first multiplier 85 is shown as one function of the controller 66, however, the multiplier 85 may be provided separately. Unlike the embodiment, in the second modification, the analogue circuit (second amplifying circuit 72) shown in FIG. 5 is not used for correcting the lowered sensitivity of the photoelectric conversion element 48.

In the structure shown in FIG. 10, instead of the second amplifying circuit 72 in FIG. 5, the first digital multiplier 85 in the controller 66 digitally multiplies image data output from the A-D converter 84 by the sensitivity correction value Sc determined according to the above expression (2), thereby to perform a correction process for increasing the amplitude thereof (increasing digital data thereof).

[Third Modification]

In the above embodiment and first and second modifications, a correction process (sensitivity correction process) is performed on the premise that the sensitivity of the photoelectric conversion element 48 is substantially proportional to the bias voltage value Vbias. According to the third modification, as shown in an electronic cassette 20C of FIG. 11, a detector section P of the electronic cassette 20C may be divided into areas A, B.

In the third modification, elements that are identical to or have the same function as those of the electronic cassette 20 according to the above embodiment are labeled by the same reference numerals for explanation.

Figure 12:
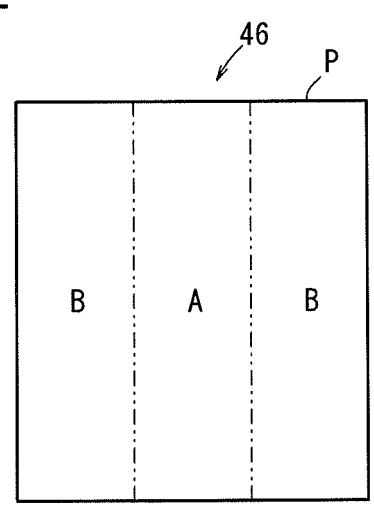
FIG. 12 is a view showing a detector section divided into areas according the third modification.

In the electronic cassette 20C, bias lines 88 connected to the photoelectric conversion elements 48 disposed in a central area A of the detector section P on the substrate 46 are connected to a common line (also referred to as a bias line or a common bias line) 92, while bias lines 90 connected to the photoelectric conversion elements 48 disposed in side areas B (see FIG. 12) of the detector section P are connected to a common line (also referred to as a bias line or a common bias line) 94. The common line 92 is connected directly to the bias power supply 64, while the common line 94 is connected to the bias power supply 64 through the current detector 62.

In the above structure, in the photoelectric conversion elements 48 directly connected to the bias power supply 64 through the bias lines 88 and the common line 92, i.e., in the photoelectric conversion elements 48 that are disposed in the central area A and are not connected to the current detector 62, even if a bias current flows therethrough on the application of radiation 16, no voltage drop occurs, and thus the sensitivity is not lowered.

In this case, as shown in FIG. 11, the amplifying circuits 70 in FIG. 5 are grouped into fourth amplifying circuits 71B (having the same circuit configuration as the third amplifying circuit 71A), and fifth amplifying circuits 71C (having the same circuit configuration as the third amplifying circuit 71A). In the fourth amplifying circuit 71B, the gain thereof at the time of reading the electric signals is set based on a current value detected by the current detector 62 at the time of application of radiation 16 in a case where the electric signals due to the electric charges are read out, through the signal lines 52, from the photoelectric conversion elements 48 connected to the current detector 62. In the fifth amplifying circuit 71C, the gain thereof at the time of reading the electric signals is set based on the current value detected by the current detector 62 at the time of application of radiation 16 in a case where the electric signals due to the electric charges are read out from the photoelectric conversion elements 48 not connected to the current detector 62.

The controller 66 sets the correction gain of the fourth amplifying circuit 71B associated with the side areas B, which are connected to the current detector 62 for detection of the bias current, such that the correction gain becomes larger as the voltage drop due to the current detector 62 becomes larger. The gain of the fifth amplifying circuit 71C for amplifying electric signals of the photoelectric conversion elements 48 disposed in the central area A not connected to the current detector 62 is not corrected.

[Fourth Modification]

Figure 13:
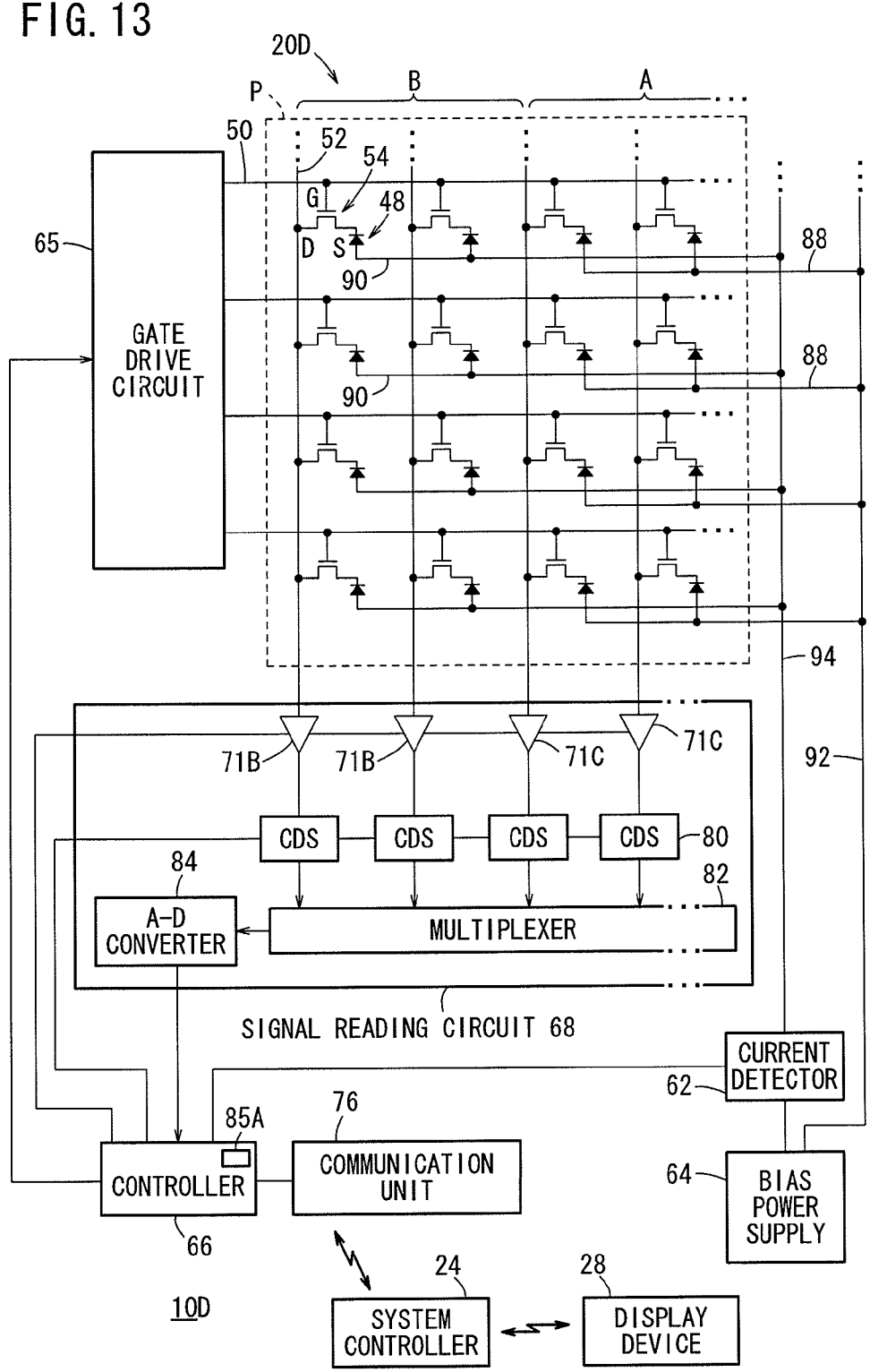
FIG. 13 is circuit diagram of a radiographic image capturing system according to a fourth modification of the present invention.

Also according to the fourth modification, as the case in FIG. 10, in an electronic cassette 20D as shown in FIG. 13, the amplifying circuits have the same circuit configuration (for example, as the third amplifying circuit 71A) and the same gain, and are grouped into the fourth amplifying circuits 71B and the fifth amplifying circuits 71C.

Then, a second digital multiplier 85A may be provided in order to equalize the amplitude Ab of image data output from the side areas B with the amplitude Aa of image data output from the area A. The image data output from the side areas B is image data that has been subjected to an A-D conversion by the A-D converter 84 through the fourth amplifying circuits 71B and the CDS circuits 80 which are connected to the photoelectric conversion elements 48 disposed in the side areas B connected to the current detector 62 for detecting the bias current, while the image data output from the area A is image data that has been subjected to an A-D conversion by the A-D converter 84 through the fifth amplifying circuits 71C which are connected to the photoelectric conversion elements 48 disposed in the central area A which are not connected to the current detector 62 so that the bias current thereof is not detected.

The second digital multiplier 85A multiplies the amplitude Ab of the output image data obtained by amplifying the electric charges from each photoelectric conversion element 48 connected to the current detector 62 by the fourth amplifying circuit 71B, by a coefficient Aa/Ab. With the second digital multiplier 85A, it is possible to correct the lowered sensitivity of the photoelectric conversion element 48, the lowered sensitivity thereof being caused in a case where a bias current causes a voltage drop, and due to the voltage drop, a lowered bias voltage is applied to the photoelectric conversion element 48.

Although certain preferred embodiments of the present invention have been shown and described in detail, it is to be understood that the present invention is not intended to be limited to the above embodiments.

Also, as described above, the present invention is applicable to a direct conversion radiographic image detecting apparatus wherein photoelectric conversion elements directly generate electric charges in response to the radiation 16 applied thereto and convert the generated electric charges into electric signals, without the use of the scintillator 44.

The photoelectric conversion element that is applicable to such a direct conversion radiographic image detecting apparatus includes a semiconductor of amorphous selenium (a-Se), CdTe, CdZnTe, $Cd_xZn_{1-x}Te$ (for example, $Cd_{0.8}Zn_{0.2}Te$), CdSe, $HgI_2$, $PbI_2$, PbO, TlBr (thallium bromide), GaAs, GaP, $Bi_xMO_y$ (where M includes at least one of Ge, Si, Ti, x satisfies an expression of $10 \leq x \leq 14$, and y represents the stoichiometric number of oxygen atoms determined by the above M and x. For example, it includes $Bi_{12}MO_{20}$ (where M includes at least one of Ge, Si, Ti)), etc.

As is known in the art, the direct conversion photoelectric conversion element is formed such that a photoelectric conversion layer (i.e. photoelectric conversion elements) is interposed between a plurality of pixel electrodes formed on a glass substrate or the like and a common bias electrode, and each pixel electrode is connected to a TFT and a capacitor having one end grounded. To the common bias electrode, one end of a bias line is connected. The other end of the bias line is connected to a high-voltage bias power supply through a current detector comprising a current mirror. The bias power supply applies a positive high voltage as a forward bias voltage to the common bias electrode through the current mirror and the bias line in the forward direction.

In the above embodiment, as shown in FIG. 5, the second amplifying circuit 72 is in the form of a variable-gain non-inverting amplifying circuit. Instead of this, the second amplifying circuit 72 may be in the form of a variable-gain non-inverting amplifying circuit constructed by a cascade connection of two inverting amplifying circuits (i.e. an upstream inverting amplifying circuit and a downstream inverting amplifying circuit). For example, in order to convert the voltage value V output from the first amplifying circuit 71 into an electric current, the upstream amplifying circuit is provided with a resistor. The resistor has one end thereof connected to the output of the first amplifying circuit 71, and the other end thereof connected to the inverting input of the operational amplifier 72a. The non-inverting input of the operational amplifier 72a is connected to a reference potential. Between the output of the operational amplifier 72a and the inverting input of the operational amplifier 72a, a variable resistor (resistance-value varying unit) 72b (second resistor) is connected. The resistance value of the variable resistor 72b is set by the controller 66. The output of the thus-constructed upstream variable-gain inverting amplifying circuit is connected to the downstream inverting amplifying circuit having a fixed gain, whereby a two-staged cascade amplifying structure containing two inverting amplifying circuits is obtained. Such a two-staged cascade amplifying structure can be used instead of the second amplifying circuit 72.

As described above, it should be understood that various changes and modifications may be made to the embodiment without departing from the scope of the invention as set forth in the appended claims.

What is claimed is:

1. A radiographic image detecting apparatus comprising:
a plurality of photoelectric conversion elements for generating electric charge by emission of radiation;
a bias line through which a bias voltage is supplied to the photoelectric conversion elements;
a power supply for applying the bias voltage to the photoelectric conversion elements through the bias line;
a current detector for detecting a bias current flowing through the bias line based on a voltage drop across a resistor inserted in the bias line;
a first amplifying circuit having a gain, wherein in a case where an electric signal due to the electric charge is read out from the photoelectric conversion elements through a signal line, the gain at a time of reading out the electric signal is set based on a current value detected by the current detector at a time of emission of the radiation;
a second amplifying circuit connected to an output of the first amplifying circuit; and
a controller for correcting the electric signal by increasing a gain of the second amplifying circuit depending on decrease in a sensitivity of the photoelectric conversion element due to the voltage drop.

2. The radiographic image detecting apparatus according to claim 1, wherein the second amplifying circuit comprises a non-inverting amplifying circuit which includes an operational amplifier having a non-inverting input connected to an output of the first amplifying circuit, a first resistor connected between an output of the operational amplifier and an inverting input of the operational amplifier, and a second resistor connected between the inverting input and a reference potential, and the controller changes a resistance value of at least one of the first and second resistors thereby to change the gain of the second amplifying circuit.

3. The radiographic image detecting apparatus according to claim 1, wherein the first amplifying circuit comprises a charge amplifier which includes an operational amplifier and a capacitance-value varying unit connected in parallel to the operational amplifier.

4. The radiographic image detecting apparatus according to claim 1, wherein the controller detects start and/or end of emission of the radiation based on increase and decrease in a current flowing through the bias line detected by the current detector.

5. The radiographic image capturing system comprising:
the radiographic image detecting apparatus according to claim 1; and
an image processor for forming a radiographic image based on electric signals which are read out from the photoelectric conversion elements and then amplified, the electric signals being output from the radiographic image detecting apparatus at the time of reading out the electric signal.

6. The radiographic image capturing system according to claim 5, wherein the radiographic image detecting apparatus and the image processor are connected to each other by a wireless communication.

7. A radiographic image detecting apparatus comprising:
a plurality of photoelectric conversion elements for generating electric charge by emission of radiation;
a bias line through which a bias voltage is supplied to the photoelectric conversion elements;
a power supply for applying the bias voltage to the photoelectric conversion elements through the bias line;
a current detector for detecting a bias current flowing through the bias line based on a voltage drop across a resistor inserted in the bias line;
an amplifying circuit having a gain, wherein in a case where an electric signal due to the electric charge is read out from the photoelectric conversion elements through a signal line, the gain at a time of reading out the electric signal is set based on a current value detected by the current detector at a time of emission of the radiation; and
a controller for correcting the lowered electric signal depending on decrease in a sensitivity of the photoelectric conversion element due to the voltage drop.

8. The radiographic image detecting apparatus according to claim 7, wherein the controller corrects the electric signal by changing the gain setting of the amplifying circuit.

9. The radiographic image detecting apparatus according to claim 7, wherein the controller includes a digital processing unit for correcting a digital value which is obtained by A-D conversion of the electric signal amplified by the amplifying circuit, such that the digital value becomes larger as the voltage drop becomes larger.

10. The radiographic image detecting apparatus according to claim 7, wherein the amplifying circuit comprises a charge amplifier which includes an operational amplifier and a capacitance-value varying unit connected in parallel to the operational amplifier.

11. The radiographic image detecting apparatus according to claim 7, wherein the controller detects start and/or end of emission of the radiation based on increase and decrease in a current flowing through the bias line detected by the current detector.

12. The radiographic image capturing system comprising:
the radiographic image detecting apparatus according to claim 7; and
an image processor for forming a radiographic image based on electric signals which are read out from the photoelectric conversion elements and then amplified, the electric signals being output from the radiographic image detecting apparatus at the time of reading out the electric signal.

13. The radiographic image capturing system according to claim 12, wherein the radiographic image detecting apparatus and the image processor are connected to each other by a wireless communication.

14. A radiographic image detecting apparatus comprising:
a plurality of photoelectric conversion elements for generating electric charge by emission of radiation;
bias lines through which a bias voltage is supplied to the photoelectric conversion elements;
a power supply for applying the bias voltage to the photoelectric conversion elements through the bias lines;
a current detector for detecting a bias current flowing through one of the bias lines, which is connected to one of the photoelectric conversion elements, based on a voltage drop across a resistor inserted in the one bias line;
a first amplifying circuit having a gain, the first amplifying circuit being connected through a signal line to the one photoelectric conversion element that is connected to the current detector connected to the one bias line, wherein in a case where an electric signal due to the electric charge is read out, through the signal line, from the one photoelectric conversion element, the gain at a time of reading out the electric signal is set based on a current value detected by the current detector at a time of emission of the radiation;
a second amplifying circuit having a gain, the second amplifying circuit being connected through another signal line to another of photoelectric conversion elements that is not connected to the current detector, wherein in a case where an electric signal due to the electric charge is read out, through the signal line, from the photoelectric conversion elements that are not connected to the current detector, the gain at a time of reading out the electric signal is set based on a current value detected by the current detector at the time of emission of the radiation; and
a controller for correcting the lowered electric signal of the first amplifying circuit depending on decrease in a sensitivity of the photoelectric conversion elements due to the voltage drop.

15. The radiographic image detecting apparatus according to claim 14, wherein the controller corrects the electric signal by changing the gain setting of the first amplifying circuit.

16. The radiographic image detecting apparatus according to claim 14, wherein the controller includes a digital processing unit for correcting a digital value which is obtained by A-D conversion of the electric signal of the first amplifying circuit, based on a digital value which is obtained by A-D conversion of the electric signal of the second amplifying circuit.

17. The radiographic image detecting apparatus according to claim 14, wherein each of the first amplifying circuit and the second amplifying circuit comprises a charge amplifier which includes an operational amplifier and a capacitance-value varying unit connected in parallel to the operational amplifier.

18. The radiographic image detecting apparatus according to claim 14, wherein the controller detects start and/or end of emission of the radiation based on increase and decrease in a current flowing through the bias line detected by the current detector.

19. The radiographic image capturing system comprising:
the radiographic image detecting apparatus according to claim 14; and
an image processor for forming a radiographic image based on electric signals which are read out from the photoelectric conversion elements and then amplified, the electric signals being output from the radiographic image detecting apparatus at the time of reading out the electric signal.

20. The radiographic image capturing system according to claim 19, wherein the radiographic image detecting apparatus and the image processor are connected to each other by a wireless communication.

* * * * *